Sept. 21, 1937.   H. B. HULL   2,093,725
REFRIGERATING APPARATUS
Filed Dec. 24, 1934   3 Sheets-Sheet 1
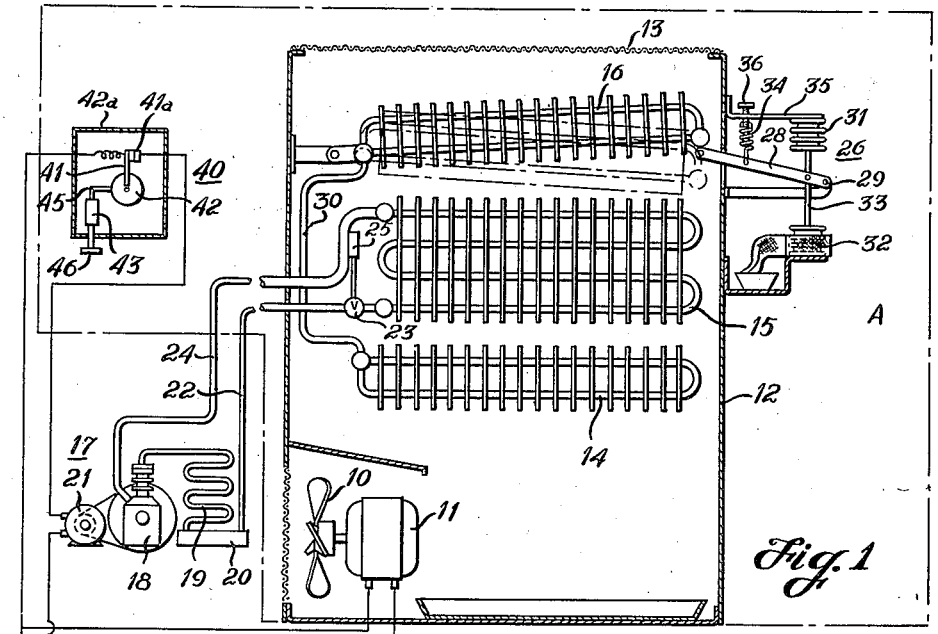
Fig. 1
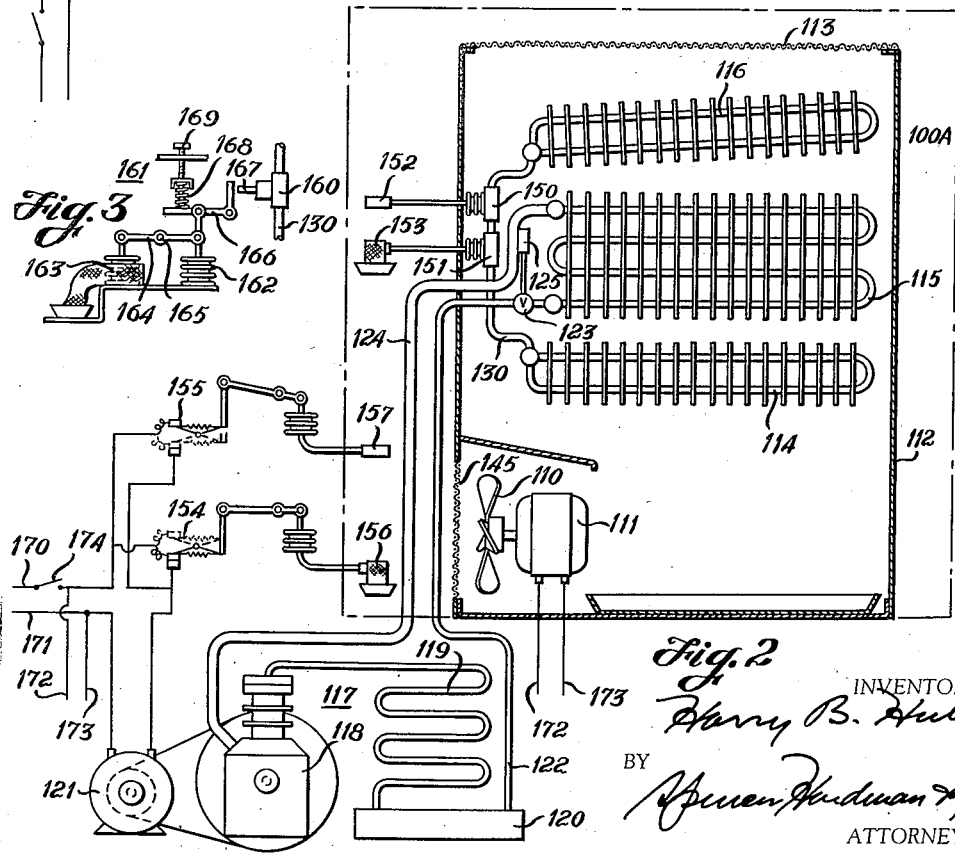
Fig. 3
Fig. 2
INVENTOR.
Harry B. Hull,
BY
ATTORNEYS Sept. 21, 1937.  H. B. HULL  2,093,725
REFRIGERATING APPARATUS
Filed Dec. 24, 1934   3 Sheets-Sheet 2
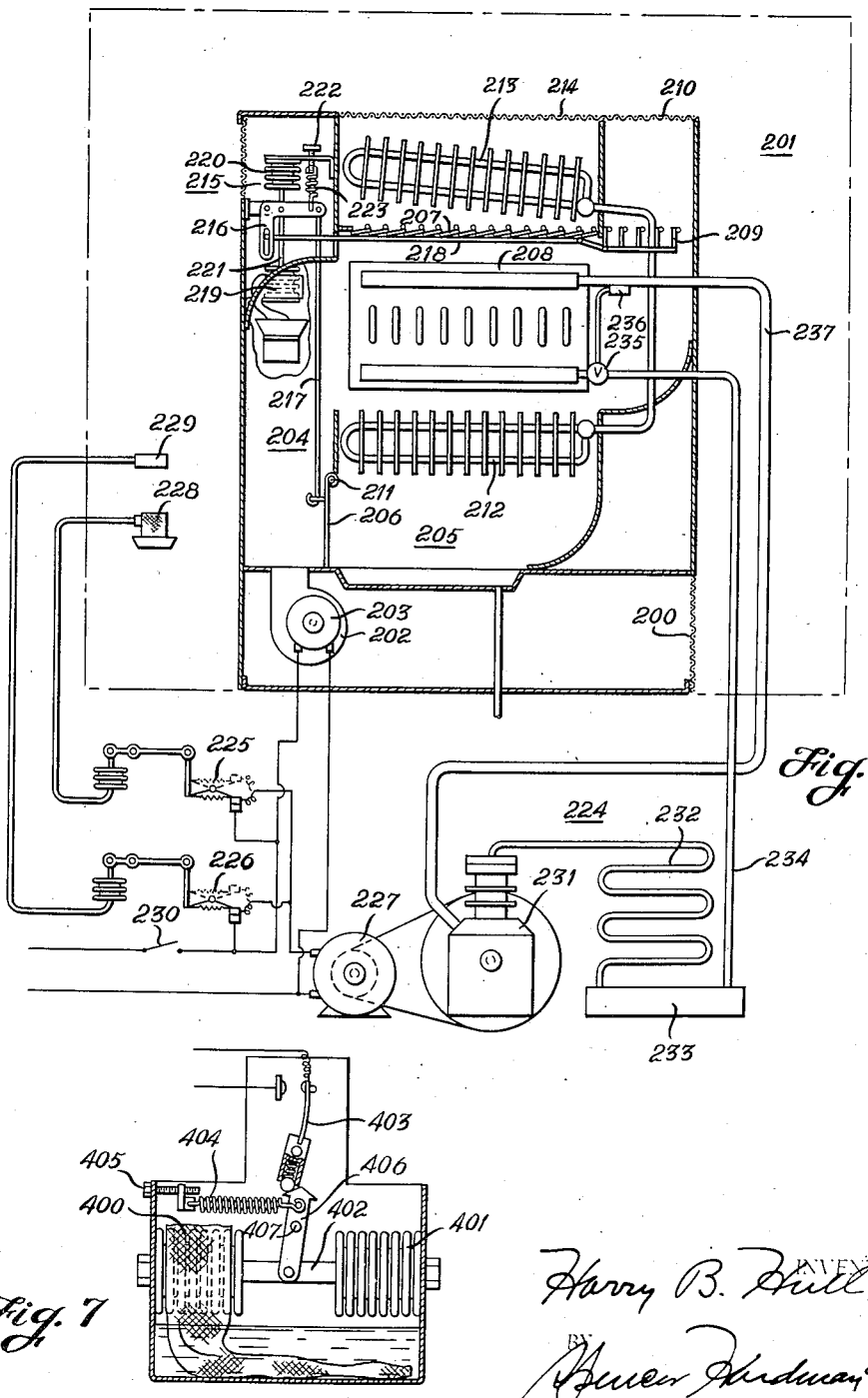

Sept. 21, 1937.  H. B. HULL  2,093,725
REFRIGERATING APPARATUS
Filed Dec. 24, 1934  3 Sheets-Sheet 3
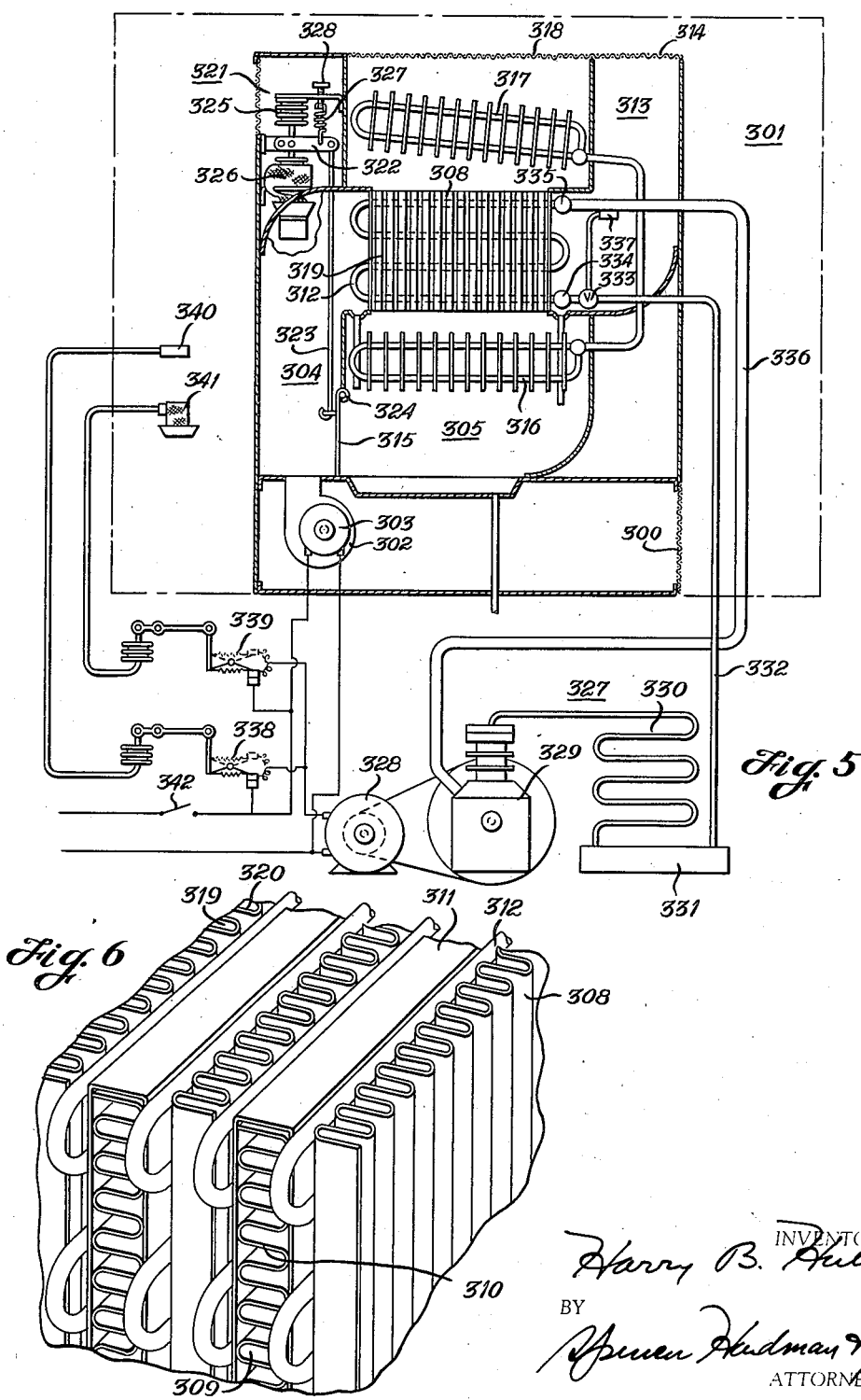

Patented Sept. 21, 1937

2,093,725

UNITED STATES PATENT OFFICE 2,093,725

REFRIGERATING APPARATUS

Harry B. Hull, Dayton, Ohio, assignor to General Motors Corporation, Dayton, Ohio, a corporation of Delaware Application December 24, 1934, Serial No. 758,884

21 Claims. (Cl. 62—6)

This invention relates to the conditioning of air.

It is an object of this invention to provide an air conditioning apparatus and method which are capable of dehumidifying the air with substantially no reduction in dry bulb temperature when conditions require such treatment and which are capable of conditioning the air with a reduction of dry bulb temperature in varying amounts as conditions require.

Further objects and advantages of the present invention will be apparent from the following description, reference being had to the accompanying drawings, wherein a preferred form of the present invention is clearly shown.

In the drawings:

Fig. 1 is a view, somewhat diagrammatic, and partly in cross-section of an apparatus embodying features of my invention;

Fig. 2 is a view somewhat similar to Fig. 1 but showing a slightly modified form;

Fig. 3 is a view, showing a modified form of control for a portion of the apparatus shown in Fig. 2;

Fig. 4 is a view somewhat similar to Fig. 1 and showing a further modification;

Fig. 5 is a view, somewhat similar to Fig. 1, but showing a further modification;

Fig. 6 is a view in perspective of a portion of the apparatus shown in Fig. 5; and Fig. 7 shows a switch responsive to relative humidity conditions.

In practicing this invention, instrumentalities are provided for transferring heat from air to be conditioned to a fluid. Thereafter the air is cooled by some independent instrumentality. The heat which has been transferred to the fluid may be introduced in varying amounts into conditioned air. By such procedure, a large portion of the sensible heat of the air above its dew point can be thus transferred to the fluid. Thereafter the independent cooling instrumentality may be used for condensing moisture out of the air or for further cooling, and, if conditions require it, the heat transferred to the fluid may be introduced into conditioned air in order to avoid an undue lowering of the dry bulb temperature, or to increase the dehydrating power of the apparatus.

To this end, the air conditioning apparatus or method includes means for establishing the flow of a stream of air, which conveniently may take the form of a fan 10 driven by a motor 11, the air circulating through a casing 12 and through the outlet 13 into the space A for which the air is to be conditioned. Means for removing or transferring heat from the air to a circulating fluid or secondary refrigerant may take the form of a secondary refrigerant evaporator 14 placed in thermal exchange with the air stream. Means for cooling the air independently of the evaporator 14 may take the form of a primary refrigerant evaporator 15 in thermal exchange with the air stream. Means for introducing heat from the secondary refrigerant into conditioned air may take the form of a secondary refrigerant condenser 16, which may be placed anywhere in thermal exchange relationship with conditioned air. Conveniently it may be placed in the path of the air stream which is being conditioned. A refrigerant liquefying unit 17 may be placed in primary refrigerant flow relationship with the evaporator 15 to furnish the necessary refrigeration. This refrigerant liquefying unit 17 conveniently may take the form of a compressor 18, a primary refrigerant condenser 19, and liquid receiver 20. The unit 17 may be driven by an electric motor 21. Liquid primary refrigerant flows through the line 22 and through the automatic expansion valve 23 to the evaporator 15. The evaporated primary refrigerant returns through the evaporated refrigerant line 24, to the compressor 18.

The expansion valve 23 may be of the type which automatically introduces liquid refrigerant into the evaporator 15 when the pressure in the evaporator is reduced below a predetermined limit. This valve may also be provided with a thermostatic bulb 25 placed in thermal exchange with the outlet of the evaporator and which automatically throttles the valve 23 when the refrigerating effect becomes sufficiently effective on the bulb 25. The calibration of the valve 23 preferably is such that the temperature of the air cooling surface of the evaporator 15 is maintained above the freezing point of water; but it is to be understood that, if desired, the evaporator may be operated at any temperature below the freezing point of water and may be periodically defrosted either during each cycle of the unit 17, or by a special defrosting cycle.

Means for controlling the flow of heat between the air and the circulating fluid or secondary refrigerant may be provided. Such means may be made responsive to any air conditions. Preferably such means are made responsive to the relative humidity conditions of the air in the enclosure A. To this end, a psychrometer or humidistat 26 may control the flow of secondary refrigerant from the evaporator 14 to the condenser 16. Conveniently this may be accomplished by mounting the condenser 16 swingably on the fulcrum 27 so that the same may be swung into a refrigerant trapping condition by the action of the psychrometer 26. Thus a lever 28, which is attached to the condenser 16, is rocked about the fulcrum 29 by the psychrometer 26. When the condenser is in the upper position shown in full lines, the secondary refrigerant flows from the evaporator 14 in gaseous form up through the line 30. The secondary refrigerant is condensed in the condenser 16 and returns to the evaporator 14 by flowing down through the line 30. When the condenser 16 is in the lower position, shown in dotted lines, it traps the liquid refrigerant and stops or reduces the interchange of heat between such refrigerant and the air.

The psychrometer 26 may be of any suitable construction. For example, it may include a dry bulb 31, and a wet bulb 32 in opposed relationship. When the relative humidity is high, the pressures within the bulbs 31 and 32 tend to be nearly equal and thus the rod 33 moves upwardly thereby moving the condenser upwardly and causing heat exchange between the secondary refrigerant and the air to take place. When the relative humidity is low, a large variation exists between the dry and wet bulb temperatures, and therefore the pressure within the dry bulb 31 tends to exceed greatly that of the wet bulb 32. Therefore the rod 33 moves downwardly, lowering the condenser 16 and trapping the secondary refrigerant in the condenser thus stopping the flow of secondary refrigerant and its action upon the air. A spring 34, connected to the lever 28 and bracket 35, may be adjusted by the screw and knob 36, so that the relative humidity to which the psychrometer is responsive may be varied or selected to suit individual requirements.

Means may be provided for controlling the thermal exchange between the air and the primary refrigerant. Such means may be made responsive to air conditions and preferably are made responsive to comfort conditions in the space for which the air is being conditioned. Thus an automatic switch 40 may control the starting and stopping of the motor 21. The automatic switch 40 may be of the type which is responsive to comfort conditions, or "effective temperature conditions" in the space. Conveniently it may take the form of a bi-metallic thermostat 41 having electric contacts 41a. The thermostat 41 is mounted upon the swinging platform 42 which is carried by base 42a. Platform 42 is actuated by any means 43, such as a piece of wood, which is responsive to relative humidity conditions in the room. The platform 42 may swing about the pivot 44 and is actuated by the wood block 43 through the medium of the lever 45. The means 43 modulates the action of the thermostat 41 in response to relative humidity conditions and thus starts and stops the unit 17 in response to effective temperature within the space to be conditioned. A manual adjustment 46, such as a screw and knob may be provided for setting the switch 40 at any desired effective temperature, by raising or lowering the block 43. The proportions of the members 40 may be proportioned so that the combined action of block 43 and thermostat 41 approximates very closely the effective temperature, as now well-known in the air conditioning art.

In the operation of the device shown in Fig. 1, and whenever conditions in the space require it, switch 40 starts the operation of the unit 17 after the fan 10 has been placed in operation by the closing of hand switch 40a. Air enters at 47, either from the space A or from the outside or both, and passes in thermal exchange relationship with the evaporator 14, evaporator 15, and condenser 16. If the relative humidity of the space A is too high, as determined by the setting of the psychrometer 26, the condenser 16 is maintained at an upper position so that heat is transferred from the air to the evaporator 14. Here substantially all, or a large part of the sensible heat of the air above its dew point is removed. Thereafter, when the air comes under thermal exchange with the evaporator 15 moisture is condensed from the air and the air may be further cooled. Thereafter the heat which was removed by the evaporator 14 is restored to conditioned air by the condenser 16 in which the secondary refrigerant condenses and from which it returns to the evaporator 14. When the relative humidity in space A is sufficiently low, the condenser 16 is placed in the lower dotted line position by the psychrometer 26, so that the secondary refrigerant is quickly trapped in the condenser 16 and the heat transfer from the air to the secondary refrigerant is stopped. Under such conditions the air is acted upon only by the evaporator 15 which cools the air and may also dehumidify it, thus reducing its dry bulb temperature with or without reducing its wet bulb temperature.

In the modification shown in Fig. 2, a fan 110, is driven by a motor 111, forcing a stream of air through the casing 112 into the space 100A through the outlet 113. The air comes in thermal exchange relationship with the secondary refrigerant evaporator 114, the primary refrigerant evaporator 114, the primary refrigerant evaporator 115, and the secondary refrigerant condenser 116. A refrigerant liquefying unit 117 is placed in primary refrigerant flow relationship with the evaporator 115, and, as in Fig. 1, includes a compressor 118, condenser 119, receiver 120 and motor 121. The primary liquid refrigerant flows through the line 122 to a valve 123 and returns through the evaporated refrigerant line 124 to the compressor 118. The valve 123 is provided with a thermostatic bulb 125. The parts thus far described may have substantially the same construction and action as previously described with respect to the corresponding parts in Fig. 1. The flow of secondary refrigerant may be controlled in a slightly different manner, however. Thus the secondary refrigerant flow line 130 may be provided with valves 150 and 151. The valve 151 may be actuated by dry bulb 152, while the valve 151 may be actuated by a wet bulb 153, both bulbs being placed in the space 100A. The refrigerant liquefying unit 117 may be controlled in accordance with air conditions in the space 100A. Thus the motor 121 may be controlled by a comfort responsive switch similar to switch 40, not shown, or, if desired, the motor 121 may be controlled by snap switches 154 and 155 placed in parallel electrical relationship and which are operated respectively by the wet bulb 156 and the dry bulb 157 placed in the space 100A. The wet bulb 156 and switch 154 may, however, be replaced by the psychrometer shown in Fig. 7.

In the operation of the device shown in Fig. 2, air enters either from the outside or from the space 100A, or from both, through inlet 145 under the action of the fan 110. The stream of air thus created comes in thermal exchange with the evaporators 114 and 115 and the condenser 116. If the dry bulb temperature is so high that the capacity of the refrigerant liquefying unit 117 will be taxed to the limit for cooling purposes, then the dry bulb 152 closes the valve 150. Under such conditions the flow of secondary refrigerant between the evaporator 114 and condenser 116 is stopped or reduced by the closure valve 150. Under such conditions, the entire cooling of the air is performed by the evaporator 115 which first reduces the temperature of the air to the dew point of the air and thereafter, if the liquefying unit 117 has sufficient capacity, moisture is condensed from the air. However, if the dry bulb temperature is not so high, but the relative humidity is sufficiently high to maintain the wet bulb temperature relatively high, then the wet bulb 153 opens the valve 151 and the valve 150 opens because the dry bulb temperature is not very high. Secondary refrigerant flow between evaporator 114 and condenser 116 is then possible. Under such conditions the air stream first transfers heat to the secondary refrigerant in evaporator 114. Thereafter it comes in thermal exchange with the evaporator 115 where moisture is removed, and thereafter the heat removed at 114 is introduced into the air by the condenser 116. Thus the air passing through the casing 112 under such conditions is dehydrated without lowering the dry bulb temperature to any great extent. The flow of refrigerant between evaporator 114 and condenser 116 need not be stopped completely, but may be merely modulated by the valves 150 and 151. The motor 111 is connected to the leads 170 and 171 by lines 172 and 173 and controlled by switch 174 which must be closed before the automatic controls can operate motor 121.

Instead of governing the passage of refrigerant through the pipe 130 as shown in Fig. 2, it may be governed in accordance with relative humidity as shown in Fig. 3. Thus the valve 160, which is substituted for valves 150 and 151, may be opened and closed by the psychrometer 161 which, conveniently, may take the form of the dry bulb 162 and wet bulb 163 acting in opposed relationship on the arm 164 fulcrumed at 165. The arm 164 actuates the bell crank 166 which in turn actuates the stem 167 of the valve 160. A spring 168, which opposes the upward action of bell crank 166, may have its tension varied by turning the screw and knob 169, and thus the setting of the psychrometer 101 can be varied so that it actuates the valve 160 at any desired relative humidity, to suit individual requirements.

The refrigerant liquefying unit 117, as shown in Fig. 2, starts whenever either dry bulb or wet bulb (or relative humidity) rises above the particular respective settings of the switches 154 and 155 (or the switch of Fig. 7) and stops when both the dry bulb and wet bulb temperatures (or relative humidity) are below the respective settings of switches 154 and 155 (or the switch of Fig. 7). When Fig. 2 is modified as shown in Fig. 3, the refrigerant liquefying unit 117 preferably is controlled by a switch similar to switch 40 placed in the enclosure 100A in accordance with the effective temperature.

In the modification shown in Fig. 4, the transfer of heat to the secondary refrigerant is governed by controlling the flow of the air through the apparatus. In this modification, air enters through the inlet 200, either from inside or outside, or both, the enclosure 201. The air flows through under action of a blower 202 actuated by a motor 203. The air travels either through the passageway 204 or 205, or both, depending on the setting of the damper 206. When the damper is in the position illustrated in Fig. 4, a set of dampers 207 is closed so that air flows through the passageway 204 in thermal contact only with the primary refrigerant evaporator 208 and thence past the dampers 209 through the outlet 210 into the enclosure 201. Under such conditions the air is subjected to the cooling effect of the evaporator 208 only.

If it is desired to remove moisture from the air without lowering the dry bulb temperature greatly, the damper 206 swings towards the left about the pivot 211, under which circumstances all or a portion of the air stream flows from the blower 200 through the passage 205 in thermal exchange with the secondary refrigerant evaporator 212, thence in contact with the primary refrigerant evaporator 208, thence through the wholly or partially opened dampers 207 in thermal exchange with the secondary condenser 213 and then through the outlet 214 into the space 201. Under such conditions the air has a portion or all of its sensible heat above its dew point transferred into the secondary refrigerant at 212, thereafter it has moisture removed by condensation by thermal exchange with the evaporator 208, and may be further cooled, and thereafter the heat removed at 212 is introduced into conditioned air at 213.

The action of the dampers, and consequently the amount of heat which is transferred into secondary refrigerant may be controlled in accordance with conditions in the space 201. Thus a psychrometer 215 may operate the bell crank 216 which in turn operates the rods 217 and 218 which govern the positions of the dampers 206, 207 and 209. The psychrometer 215 may take the form of a wet bulb 219 and the dry bulb 220, placed in opposed relationship and tending to actuate the rod 221 which is connected to the bell crank 216. When the relative humidity is high, the pressure in the wet bulb 219 tends to be nearly equal to that of the bulb 220. Under such conditions the flow through passage 205 and through dampers 207 is increased. When the relative humidity is low, the pressure in the dry bulb 220 tends to be much greater than in the wet bulb 219. Under such conditions the flow tends to be through the passageway 204 and through the damper 209. An adjustment 222 in the form of a screw and knob may be provided by which the tension of spring 223 may be varied and thus the setting of the psychrometer 215 may be adjusted for any desired relative humidity. Thus the thermal exchange between air and the secondary refrigerant may be varied by changing the dampers 206, 207 and 209 to fully open, fully closed or any intermediate position.

The cooling action of the primary refrigerant in the evaporator 208 may be varied in accordance with conditions in the air. Preferably the control of such cooling action is made responsive to the conditions in the enclosure 201. The operation of the refrigerant liquefying unit 224 which is connected to the evaporator 208, may be controlled by switches 225 and 226 which are placed in parallel electrical relationship so that either switch can cause the operation of the motor 227 which operates the unit 224. The switch may be opened and closed by the wet bulb 225 in enclosure 201 while the switch 226 may be opened and closed by dry bulb 229 in enclosure 201. The bulb 228 and switch 226 may be replaced by the psychrometer shown in Fig. 7, if desired. Whenever either the dry bulb or wet bulb temperatures (or relative humidity) in the space 201 rises above the settings of the respective switches, the motor 227 operates until the temperatures of both the dry and wet bulb (or the relative humidity) are lowered below the setting of the respective switches. A hand switch 230 may be placed in such a manner that the blower 202 must first be started before the motor 227 can be operated by the switches 225 and 226.

The refrigerant liquefying unit 224 may include a compressor 231, primary refrigerant condenser 232, and a receiver 233 in primary refrigerant flow relationship. Liquid refrigerant may flow through the line 234 to the valve 235, similar in construction and operation to the valve 23, and which is provided with a thermostatic bulb control 236 similar to bulb 25. The evaporated refrigerant returns through the line 237 to the compressor 231.

If, desired, the operation of the unit 224 may be made responsive to effective temperatures. Under such conditions, a switch, similar to switch 40, may be placed in the space 201, and may replace switches 225 and 226 together with their bulb controls.

In the modification shown in Fig. 5, a slightly different form of air flow control may be used than that shown in Fig. 4. Air may enter through the inlet 300 from the space 301 or from outside space, or from both. It may flow under action of a blower 302 driven by motor 303 either into the passageway 304 or passageway 305 or both. If it flows through the passageway 304 it comes into thermal exchange relationship with the evaporator 308 by passing through the passages 309 formed by the corrugated metal sheet 310 which is placed inside of the metal box 311 the sides of which come in contact with the coils 312 of the evaporator 308. After passing through the passageways 309, the air is discharged through the passageway 313, and through outlet 314, into the space 301.

If the damper 315 swings to the left, then the air from blower 302 flows into passageway 305, from whence it comes in thermal exchange with the secondary refrigerant evaporator 316 thence in thermal exchange with the evaporator 308 thence in thermal exchange with the secondary refrigerant condenser 317. Thereafter the air is discharged through the outlet 318 into the space 301. Under such conditions the air flowing in thermal exchange with the evaporator 308 passes through vertical passageways 319 formed by the corrugated metal sheet 320 placed in contact with the coils 312 of the evaporator 308.

The flow of air through the apparatus, and consequently the amount of heat which is transferred to the secondary refrigerant, is governed in accordance with air conditions, preferably the relative humidity conditions of the air in space 301. Thus the psychrometer 321 actuates the lever 322 which in turn actuates the rod 323 which is connected to the damper 315 and switches it about the fulcrum 324. The psychrometer 321 may include a dry bulb 325 and a wet bulb 326 in opposed relationship. The construction is such that as relative humidity rises, the pressures in the bulbs 325 and 326 tend to equalize, and under such conditions the damper 315 is swung upwardly towards the left causing the flow through passageway 305 in thermal exchange with the evaporators 316, 308 and with the condenser 317. When the relative humidity is low, then the tendency of the flow of air is through the passageway 304. A spring 327 opposes slightly the thrust of dry bulb 325 and its tension may be adjusted by the screw and knob 328 so that the relative humidity to which the psychrometer is responsive may be varied for individual requirements.

It is to be understood that, with respect to both Figs. 4 and 5 the position of the air dampers may be intermediate, so that part of the air may be flowing in thermal contact with the secondary refrigerant while part of the air does not come in thermal contact with the secondary refrigerant. Thus the action described may vary from one extreme to the other and to any intermediate position.

The primary evaporator 308 may be connected to a refrigerant liquefying unit 327. This unit may include a motor 328, compressor 329, primary refrigerant condenser 330 and liquid receiver 331. Liquid primary refrigerant flows through the line 332, through valve 333, similar to valve 23, into a lower header 334. From thence the refrigerant flows in parallel relationship through a plurality of sinuous conduits 312 to the upper header 335. From thence the evaporated refrigerant returns through the line 336 to the compressor 329. The valve 333 may be provided with a thermostatic bulb 337 similar in construction and action to the bulb 25.

The cooling action of the primary refrigerant may be controlled by starting and stopping the liquefying unit 327. Thus the motor 328 may be started and stopped by the switches 338 and 339 placed in electrical parallel relationship and which are actuated by dry bulb 340 and wet bulb 341 respectively, or by the phychrometer shown in Fig. 7, substantially the same as the switches 225 and 226 in Fig. 4. A hand switch 342 may be provided in such a position that the motor 303 must be first operated before the motor 328 can be operated. If desired, the switches 338 and 339 may be replaced by a switch similar to switch 40 in which case the operation of the unit 327 will be in response to the effective temperature in space 301.

In Fig. 7 is shown a switch which may be made to replace the wet bulb switches 154, 225 and 339. In this structure the wet bulb 400 opposes the dry bulb 401 through rod 402 and acts on the snap switch 403 through the medium of a cam lever 406 fulcrumed at 407. The spring 404 places its tension in opposition to the dry bulb and may be adjusted by knob 405. The switch may start and stop the motor in accordance with relative humidity in the enclosure, starting it when the relative humidity is high and stopping it when low.

While the preferred form of automatic controls have been specifically illustrated and described, it is to be understood that their form and character may be modified, if desired. For example, wherever a dry bulb thermostat is illustrated or described, the same may be replaced by a wet bulb thermostat, humidistat or effective temperature responsive instrument. Likewise wherever a wet bulb thermostat, humidistat or effective temperature responsive instrument is illustrated or described, the same may be replaced by any one of the other three controls referred to.

While the form of embodiment of the present invention as herein disclosed, constitutes a preferred form, it is to be understood that other forms might be adopted, all coming within the scope of the claims which follow.

What is claimed is as follows:

1. An air conditioning apparatus for which an air stream is established, a secondary refrigerant evaporator in thermal exchange relationship with said stream, a primary refrigerant evaporator in thermal exchange relationship with said stream, a secondary condenser connected to said secondary refrigerant evaporator in secondary refrigerant flow relationship and in thermal exchange relationship with conditioned air, a refrigerant liquefying unit connected in primary refrigerant flow relationship with said primary refrigerant evaporator and means responsive to a function of the psychrometric properties of the air automatically controlling said liquefying unit.

2. An air conditioning apparatus for which an air stream is established, a secondary refrigerant evaporator in thermal exchange relationship with said stream, a primary refrigerant evaporator in thermal exchange relationship with said stream, a secondary condenser connected to said secondary refrigerant evaporator in secondary refrigerant flow relationship and in thermal exchange relationship with conditioned air, a refrigerant liquefying unit connected in primary refrigerant flow relationship with said primary refrigerant evaporator, means responsive to psychrometric air conditions for controlling the thermal exchange between the secondary refrigerant and air and means responsive to the psychrometric conditions of the air for controlling the operation of said refrigerant liquefying unit.

3. An air conditioning apparatus for which an air stream is established, a secondary refrigerant evaporator in thermal exchange relationship with said stream, a primary refrigerant evaporator in thermal exchange relationship with said stream, a secondary condenser connected to said secondary refrigerant evaporator in secondary refrigerant flow relationship and in thermal exchange relationship with conditioned air, a refrigerant liquefying unit connected in primary refrigerant flow relationship with said primary refrigerant evaporator, means responsive to psychrometric air conditions for controlling the flow of primary refrigerant in said primary refrigerant evaporator.

4. An air conditioning apparatus for which an air stream is established, a secondary refrigerant evaporator in thermal exchange relationship with said stream, a primary refrigerant evaporator in thermal exchange relationship with said stream, a secondary condenser connected to said secondary refrigerant evaporator in secondary refrigerant flow relationship and in thermal exchange relationship with conditioned air, a refrigerant liquefying unit connected in primary refrigerant flow relationship with said primary refrigerant evaporator, means responsive to the psychrometric conditions of the air for automatically controlling the flow of secondary refrigerant and means responsive to psychrometric air conditions for controlling the operation of said refrigerant liquefying unit.

5. An air conditioning apparatus for which an air stream is established, a secondary refrigerant evaporator member in thermal exchange relationship with said stream, a primary refrigerant evaporator in thermal exhange relationship with said stream, a secondary condenser member connected to said secondary refrigerant evaporator member in secondary refrigerant flow relationship and in thermal exchange relationship with conditioned air, a refrigerant liquefying unit connected in primary refrigerant flow relationship with said primary refrigerant evaporator, and means responsive to psychrometric conditions of air for tilting one of said members to govern the flow of secondary refrigerant.

6. An air conditioning apparatus comprising means establishing an air stream, a secondary refrigerant evaporator member, a primary cooler and a secondary refrigerant condenser member in said air stream, and means for varying the position of one of said members in accordance with psychometric air conditions whereby the effect of said members on said air stream is varied.

7. An air conditioning apparatus comprising means establishing an air stream, a secondary refrigerant evaporator member, a primary refrigerant evaporator and a secondary refrigerant condenser member in said air stream, a primary refrigerant liquefying unit connected to said primary refrigerant evaporator, means for varying the position of one of said members in accordance with psychrometric air conditions whereby the effect of said members on said air stream is varied and means governing the flow of primary refrigerant in accordance with air conditions.

8. An air conditioning apparatus comprising means establishing an air stream, a secondary refrigerant evaporator, a primary refrigerant evaporator and a secondary refrigerant condenser in said air stream, means controlling the flow of secondary refrigerant between said secondary refrigerant evaporator and said condenser in accordance with relative humidity and temperature conditions, a primary refrigerant liquefying unit, and means controlling the operation of said liquefying unit in accordance with conditions of air.

9. An air conditioning apparatus comprising a secondary air cooler, a secondary air warmer, a primary air cooler, means for flowing air over said coolers and warmer, and means for causing air to flow at least partly over said secondary air cooler, primary air cooler and secondary air warmer and at least partly over said primary air cooler alone.

10. An air conditioning apparatus comprising a secondary air cooler, a secondary air warmer, a primary air cooler, means for flowing air over said coolers and warmer, means for causing air to flow at least partly over said secondary air cooler, primary air cooler, and secondary air warmer and at least partly over said primary air cooler alone, and means automatically controlling the flow of air in accordance with air conditions.

11. Air conditioning apparatus comprising a casing, means causing air to flow through said casing, a secondary air cooler in said casing, a primary air cooler in said casing, a secondary air warmer in said casing, and damper means for varying the flow of air from a path over said secondary air cooler, primary air cooler and secondary air warmer to a path over said primary air cooler.

12. An air conditioning apparatus comprising a casing, means causing air to flow through said casing, a secondary air cooler in said casing, a primary air cooler in said casing, a secondary air warmer in said casing, damper means for varying the flow of air from a path over said secondary air cooler, primary air cooler and secondary air warmer to a path over said primary air cooler, and means governing said damper means in accordance with air conditions.

13. An air conditioning apparatus comprising a casing, means causing air to flow through said casing, a secondary air cooler in said casing, a primary air cooler in said casing, a secondary air warmer in said casing, damper means for varying the flow of air from a path over said secondary air cooler, primary air cooler and secondary air warmer to a path over said primary air cooler, and means governing the cooling power of said primary air cooler in accordance with air conditions.

14. An air conditioning apparatus comprising a casing, a blower causing air to flow in a generally upward direction through said casing, a secondary refrigerant evaporator in said casing, a primary air cooler in said casing above said evaporator, a secondary refrigerant condenser above said air cooler, damper means for directing air mainly first past said secondary refrigerant evaporator or mainly first past said primary air cooler and thereafter mainly past said secondary refrigerant condenser or mainly by passing said condenser.

15. An air conditioning apparatus comprising a secondary air cooler, a primary air cooler, a secondary air warmer, means causing air to flow past said air coolers and air warmer, said primary air cooler having air flow passageway means connected to receive air from said secondary air cooler and having independent air flow passageway means connected to by-pass said secondary air cooler.

16. An air conditioning apparatus comprising a secondary air cooler, a primary air cooler, a secondary air warmer complementary to said secondary air cooler, means causing air to flow past said air coolers and air warmer, said primary air cooler having air-flow passageway means connected to discharge air past said secondary air warmer and having independent air flow passageway means connected to by-pass said secondary air warmer.

17. An air conditioning apparatus comprising a secondary air cooler, a primary air cooler, a secondary air warmer, means causing air to flow past said air coolers and air warmer, said primary air cooler having air-flow passageway means connected to receive air from said secondary air cooler and discharge said air past said secondary air warmer, and having independent air-flow passageway means connected to by-pass said secondary air cooler and said secondary air warmer.

18. An air conditioning apparatus comprising a secondary air cooler, a primary air modifier, a secondary air warmer, said air modifier having a plurality of corrugated metal sheets in thermal contact with said air modifier with the corrugations forming air passageways, some of said corrugations having a different direction from other of said corrugations, some of said corrugations forming air passageways between said secondary air cooler and said secondary air warmer, and other of said corrugations being connected to by-pass said air cooler and air warmer.

19. An air conditioning apparatus comprising a secondary air cooler, a primary air modifier, a secondary air warmer, said air modifier having a plurality of corrugated metal sheets in thermal contact with said air modifier with the corrugations forming air passageways, some of said corrugations having a different direction from other of said corrugations, some of said corrugations forming air passageways between said secondary air cooler and said secondary air warmer, and other of said corrugations being connected to by-pass said air cooler and air warmer, and damper means to vary the flow of air through said corrugations.

20. An air conditioning apparatus comprising means for cooling air, fluid flow means to remove sensible heat from air about to contact said means for cooling air, means to introduce said heat into conditioned air, and means for controlling the operation of said cooling means in accordance with effective temperature.

21. The method of conditioning air which comprises transferring heat from air to a circulating fluid, cooling the air in accordance with effective temperature conditions whereby moisture is removed independently of said fluid, and removing said heat from said fluid.

HARRY B. HULL.